(12) United States Patent
Lee et al.

(10) Patent No.: US 11,886,663 B2
(45) Date of Patent: Jan. 30, 2024

(54) DISPLAY DEVICE COMPRISING TOUCH FUNCTION AND OPERATING METHOD THEREOF

(71) Applicant: LG Display Co., Ltd., Seoul (KR)

(72) Inventors: Kyurag Lee, Gyeonggi-do (KR); DongHoon Lee, Daegu (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/871,621

(22) Filed: Jul. 22, 2022

(65) Prior Publication Data
US 2023/0042028 A1 Feb. 9, 2023

(30) Foreign Application Priority Data
Aug. 4, 2021 (KR) .................. 10-2021-0102454

(51) Int. Cl.
*G06F 3/041* (2006.01)
*G06F 3/044* (2006.01)

(52) U.S. Cl.
CPC ...... *G06F 3/04182* (2019.05); *G06F 3/04164* (2019.05); *G06F 3/0446* (2019.05)

(58) Field of Classification Search
CPC ............ G06F 3/04182; G06F 3/04164; G06F 3/0446
USPC ............................................ 345/173
See application file for complete search history.

(56) References Cited

U.S. PATENT DOCUMENTS

| | | | |
|---|---|---|---|
| 2018/0046325 A1* | 2/2018 | Kim ............... | G06F 3/0412 |
| 2020/0142563 A1* | 5/2020 | Kim ............... | G06F 3/0418 |
| 2021/0072892 A1* | 3/2021 | Lee ............... | B60K 35/00 |
| 2022/0317803 A1* | 10/2022 | Yun ............... | G06F 3/04164 |

* cited by examiner

*Primary Examiner* — Mark Edwards
(74) *Attorney, Agent, or Firm* — Seed IP Law Group LLP

(57) ABSTRACT

A display apparatus with a touch function and an operating method thereof are provided. The display apparatus with a touch function according to an embodiment of the present disclosure may include a touch line connected to a touch electrode disposed in a display area of the display apparatus, a noise sensing line disposed to be spaced apart from the touch line by a first distance in a non-display area of the display apparatus, a driving signal line for providing a driving signal of the display apparatus in the non-display area, and a touch driving circuit for identifying information on a touch input using a touch input signal acquired through the touch line and a noise signal acquired through the noise sensing line. Accordingly, the information on the touch input can be more accurately identified by controlling a touch input signal using a line for detecting a noise.

24 Claims, 8 Drawing Sheets

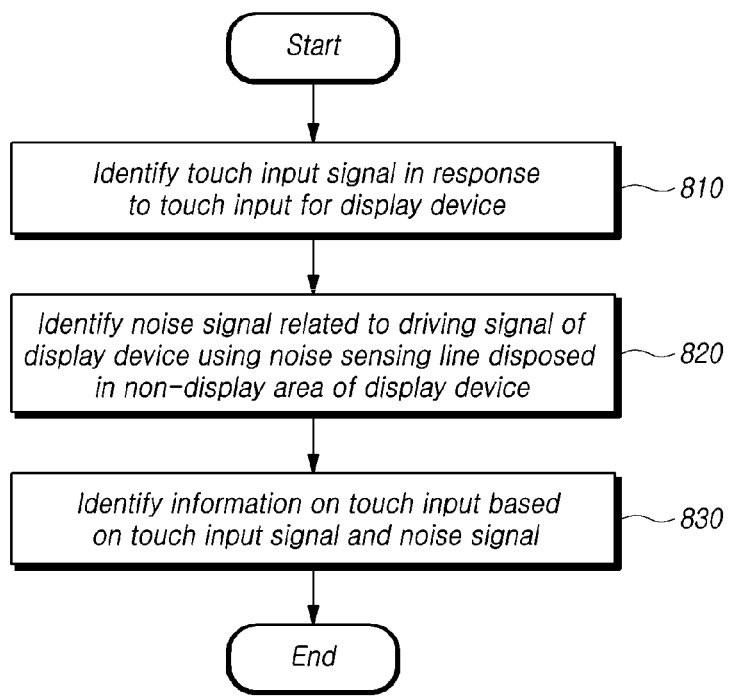

DISPLAY DEVICE COMPRISING TOUCH FUNCTION AND OPERATING METHOD THEREOF

CROSS REFERENCE TO RELATED APPLICATION

This application claims priority from Korean Patent Application No. 10-2021-0102454, filed on Aug. 4, 2021, which is hereby incorporated by reference for all purposes as if fully set forth herein.

BACKGROUND

Technical Field

Embodiments of the present disclosure relates to a display device (display apparatus) with a touch function and an operating method thereof. More particularly, embodiments of the present disclosure relates to a display device and an operating method thereof capable of more accurately checking information on touch input by reducing a noise.

Description of the Related Art

Recently, as entering the information age, there has been rapidly developed the field of display device for visually expressing electrical information signals. In response to this, there is being developed various display devices with excellent performance of thinner, lighter and lower power consumption. The display device may be classified into various types, for example, a liquid crystal display device (LCD), an organic light emitting display device (OLED), and a quantum dot display device.

A display device acquires an input from the user to display various information or perform an operation. The input from the user may be obtained in various ways, for example, an input by a keyboard, an input by a mouse, and a touch input. The touch input is an input resulting from direct contact of an object (e.g., a human hand, a touch pen) to the display area where light emitting devices are arranged and light is emitted, and it has been widely used since the user can easily and conveniently use.

In order to recognize a touch input, a function (hereinafter, a touch function) for touch recognition such as a resistive type, a capacitive type, and an infrared type has been used. Among them, the capacitive type is widely used, and the capacitive type can recognize the touch input by recognizing the difference in capacitance before and after the touch and extracting the coordinates.

However, the display device may include various configurations including a gate-in-panel (GIP) in addition to the configuration related to the touch function.

BRIEF SUMMARY

As described, utilizing various configurations in a display device such as a gate-in-panel (GIP) in addition to the utilizing configuration related to a touch function, may generate a signal that acts as a noise with respect to the other function. For example, in some cases, a signal generated by an operation of a different display configuration unrelated to the touch function may act as noise of the touch input, thereby causing deterioration of the touch function. Accordingly, it is beneficial to have a method for reducing noise in order to improve the performance of the touch function.

One or more embodiments of the present disclosure provide a display device capable of providing a more improved touch function by controlling a touch input signal using a line for detecting noise, and an operating method thereof However, the technical benefits of the present disclosure are not limited to those mentioned above, and may have other technical benefits inferred from the following embodiments.

In an aspect of the present disclosure, there is provided a display device with a touch function including a touch line connected to a touch electrode disposed in a display area of the display device, a noise sensing line disposed to be spaced apart from the touch line by a first distance in a non-display area of the display device, a driving signal line for providing a driving signal of the display device in the non-display area, and a touch driving circuit for identifying information on a touch input using a touch input signal acquired through the touch line and a noise signal acquired through the noise sensing line.

In another aspect of the present disclosure, there is provided a display device with a touch function including a device driver configured to generate a driving signal of the display device, a noise detector configured to identify a noise signal related to the driving signal using a noise sensing line disposed in a non-display area of the display device, and a touch driver configured to identify a touch input signal corresponding to a touch input to the display device, and to identify information on the touch input based on the touch input signal and the noise signal.

In another aspect of the present disclosure, there is provided an operating method of a display device including identifying a touch input signal corresponding to a touch input to the display device, identifying a noise signal related to a driving signal of the display device using a noise sensing line disposed in a non-display area of the display device, and identifying information on the touch input based on the touch input signal and the noise signal.

The specific details of other embodiments are included in the detailed description and drawings.

According to a display device of the present disclosure, the information on the touch input can be more accurately identified by controlling a touch input signal using a line for detecting a noise.

However, the effects obtainable in the present disclosure are not limited to the above-mentioned effects, and other effects not mentioned may be understood clearly to those of ordinary skill in the art to which this disclosure belongs from the description below.

BRIEF DESCRIPTION OF THE SEVERAL VIEWS OF THE DRAWINGS

FIG. 8 is a diagram illustrating a flow for each step of operating a display device according to an embodiment of the present disclosure.

DETAILED DESCRIPTION

Figure 1:
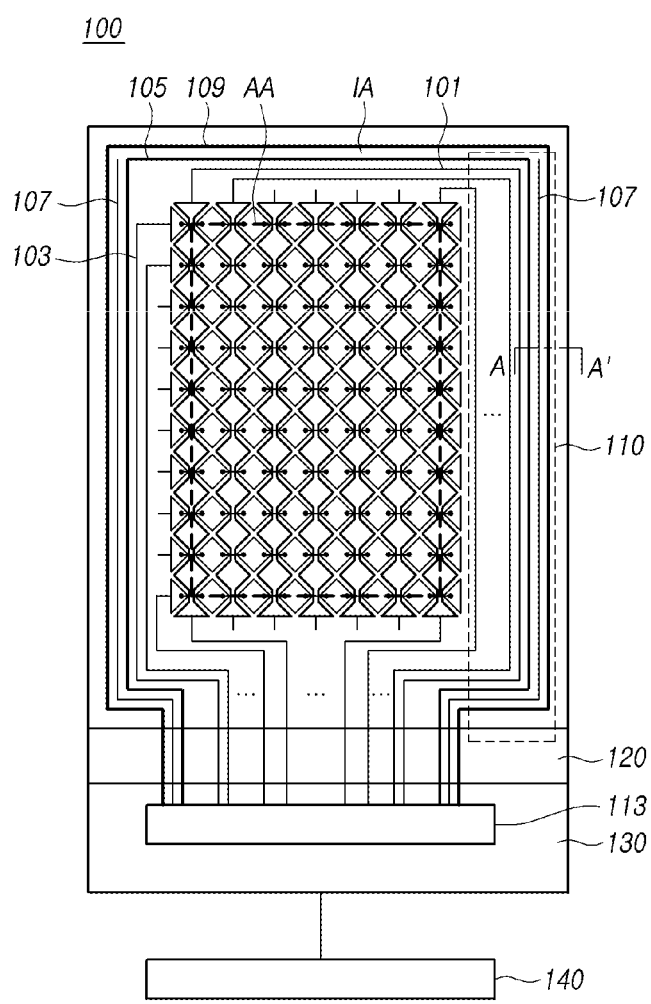
FIG. 1 is a diagram for explaining a display device according to an embodiment of the present disclosure.

The terms used in the embodiments are selected as currently widely used general terms as possible while considering the functions in the present disclosure, which may vary depending on the intention of a person skilled in the art, the precedent, or the emergence of new technology, etc. In addition, in a specific case, there is a term arbitrarily selected by the applicant, and in this case, the meaning thereof will be described in detail in the corresponding description. Therefore, the terms used in the present disclosure should be defined based on the meaning of the term and the overall contents of the present disclosure, rather than the simple name of the term.

In the entire specification, when a part "includes" a specific element, it means that other elements may be further included, rather than excluding other elements, unless otherwise stated.

The expression of "at least one of a, b, and c" described throughout the specification may include a configuration of 'a alone,' 'b alone,' 'c alone,' 'a and b,' 'a and c,' 'and c,' or 'all a, b, and c.' Advantages and features of the present disclosure, and a method for achieving them will become apparent with reference to the embodiments described below in detail in conjunction with the accompanying drawings.

The shape, size, dimensions (e.g., length, width, height, thickness, radius, diameter, etc.), area, ratio, angle, number of elements, etc., disclosed in the drawings for explaining the embodiment in the present specification are examples and the embodiment of the present specification is not limited to the illustrated matters. In addition, in describing the embodiment, if it is determined that a detailed description of a related known technology may unnecessarily obscure the gist of the embodiment, the detailed description thereof will be omitted.

In the case that the terms of 'include,' 'have,' 'consist,' 'comprise,' etc., are used in this specification, it should be understood as being able to add other parts or elements. When an element is expressed in the singular, there may be understood to include cases including the plural unless otherwise explicitly stated. In addition, in interpreting the elements, it should be interpreted as including an error range even if there is no separate explicit description.

In the description related to spatial relationship, for example, when the positional relationship of two element is described using the terms of "on," "upper," "above," "below," "under," "beneath," "lower," "near," "close," "adjacent," it should be interpreted that one or more elements may be further "interposed" between the elements unless the terms such as "directly," "only" are used. The configuration in which an element or layer is disposed "on" another element or layer includes both the case where the element or layer is disposed directly on the other element or layer, and the case where other layer or other element is interposed therebetween.

When the terms, such as "first," "second," or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The area, size, dimension, length, or thickness of each component described in the specification is illustrated for convenience of description, and the present disclosure is not necessarily limited to the area and thickness of the illustrated component.

The features of each of the embodiments of the present specification may be partially or wholly combined or coupled with each other, and may be various technically linked or operated. In addition, each of the embodiments may be implemented independently of each other or may be implemented together in a related relationship.

In addition, the terms to be described later are terms defined in consideration of functions in the implementation of the present specification, which may vary depending on the intention or custom of the user or operator. Therefore, the definition should be made based on the content throughout this specification.

Expressions such as 'first,' 'second,' and 'third' are terms used to classify configurations according to embodiments, and embodiments are not limited to these terms. Therefore, it should be noted that even the same terms may refer to different components according to embodiments.

The following embodiments will be mainly described with respect to an organic light emitting diode display device. However, embodiments of the present disclosure are not limited to an organic light emitting display device, and may be applied to an inorganic light emitting display device including an inorganic light emitting material. For example, embodiments of the present disclosure may be applied to a quantum dot display device. in addition, there may be applied to various devices capable of performing an inspection using an inspection device in addition to a display device.

Hereinafter, embodiments of the present disclosure will be described with reference to the drawings.

FIG. 1 is a diagram for explaining a display device according to an embodiment of the present disclosure.

Referring to FIG. 1, the display device 100 may include a display area AA and a non-display area IA. A plurality of pixels are disposed in the display area AA, and thus image information may be displayed in the display area AA. Various configurations for displaying image information may be arranged in the display area AA. For example, components such as a driving transistor, a switching transistor, and a light shield (LS) may be disposed in the display area AA.

In an embodiment, a touch configuration may be disposed in the display area AA. The touch configuration may include, for example, a touch electrode. In this case, the display area AA may correspond to a touch area to which a touch input is applied. The display area AA may be referred to as a touch area according to an embodiment.

The display area AA may include a first touch electrode arranged in a first direction (e.g., a Y-axis direction) and a second touch electrode arranged in a second direction (e.g., an X-axis direction). For example, at least one electrode may be disposed in the display area AA along the first direction to form a first touch electrode corresponding to the first column. In addition, at least one electrode may be disposed in the display area AA along the second direction to form a second touch electrode corresponding to the first row.

In an embodiment, a plurality of touch electrodes may be disposed in the display area AA, and accordingly, the touch electrodes may be configured in a plurality of columns and a plurality of rows. In the case that the touch electrodes are configured with a plurality of columns and a plurality of rows, there may be also provided a plurality of touch lines to correspond to each column and row. In this case, there is noted that a first touch line and a second touch line described in the embodiments of the present specification are the lines disposed at the outermost portion of the display area. That is, the first touch line may be an outermost line among touch lines corresponding to a plurality of columns, and the second touch line may be an outermost line among touch lines corresponding to a plurality of rows.

In an embodiment, the touch configuration may be implemented in a form disposed on an encapsulation layer. In some cases, the touch configuration may be configured as a separate detachable panel and disposed on the display area AA, however, the present disclosure is not limited to such implementation example of the touch configuration.

In an embodiment, a touch panel of the display device 100 may have a metal mesh and a diamond node structure. The metal mesh may refer to an electrode patterned in a mesh shape, and the diamond node may refer that a node between the electrode and the electrode is diamond-shaped. Here, the diamond node represents an example of a node shape and is not limited thereto, and may be implemented in various shapes. The touch panel is a term including a form in which a touch electrode is disposed on an encapsulation layer, however, embodiments are not limited thereto.

In an embodiment, the display device 100 may use at least one of a self-capacitive method and a mutual-capacitive method to implement a touch function. For example, the display device 100 may perform a recognition using the self-capacitive method and a recognition using the mutual-capacitive within one frame for recognizing a touch input to finally acquire a touch input signal for one frame. Here, the self-capacitive method may refer to a method in which each of a plurality of touch lines (e.g., the first touch line 101 and the second touch line 103) sequentially senses a touch input. The mutual-capacitive method may refer to a method in which a signal corresponding to the touch input is received through the reception line including the second touch line 103 in response to apply a signal for touch driving through the transmission line including the first touch line 101. It will be described a more detailed description related thereto with reference to FIGS. 4A and 4B.

The non-display area IA may be an area surrounding the display area AA as illustrated. For example, the non-display area IA may be a remaining area other than the display area AA on the plane of the display device 100, and may correspond to an area in which image information is not displayed.

At least one configuration related to an operation of the display area AA may be disposed in the non-display area IA. In the non-display area IA, there may be disposed at least one of touch lines (e.g., the first touch line 101 and the second touch line 103), a guard line 105, a noise sensing line 107, a ground line 109, a driving signal line (not shown), a touch driving circuit 113, a cathode (not shown), and an anode (not shown).

In an embodiment, the touch line may be connected to a touch electrode disposed in the display area AA of the display device 100. The touch line may include a transmission line Tx including the first touch line 101 and a reception line Rx including the second touch line 103. The transmission line may transmit a signal for driving the touch electrode from the touch driving circuit 113. The reception line may transmit a signal detected through the touch electrode to the touch driving circuit 113. The first touch line 101 and the second touch line 103 may be referred to by various terms according to embodiments, but embodiments are not limited to these terms.

In an embodiment, the transmission line may be composed of a plurality of lines. For example, the transmission line may be composed of a plurality of line individually connected to the electrodes as shown. In this case, the first touch line 101 may correspond to the outermost line among the plurality of lines constituting the transmission line. Here, the outermost line may correspond to, for example, a line having the longest distance from the display area AA among the plurality of lines.

In an embodiment, the reception line may be composed of a plurality of lines. For example, the reception line may be composed of a plurality of line individually connected to the electrodes. In this case, the second touch line 103 may correspond to an outermost line. Here, the outermost line may correspond to, for example, a line having the longest distance from the display area AA among the plurality of lines.

In an embodiment, the touch line may be disposed outside the display area AA. For example, assuming that the display area AA has four sides, the first touch line 101 may be disposed to correspond to the first side. The second touch line 103 may be disposed to correspond to a second side separated from the first side. In this case, each of the four sides of the display area AA may correspond to one of the first touch line 101 and the second touch line 103. However, the present embodiment is not limited thereto, and at least a portion of the first touch line 101 and at least a portion of the second touch line 103 may be disposed on at least one of the four sides of the display area AA according to an embodiment.

In an embodiment, one end of the first touch line 101 may be connected to a touch electrode and the other end thereof may be connected to the touch driving circuit 113. One end of the second touch line 103 may be connected to a touch electrode and the other end thereof may be connected to the touch driving circuit 113. According to an embodiment, a touch electrode may be disposed in the display area AA and the non-display area IA as illustrated. In this case, the first touch line 101 may be connected to the touch electrode disposed in the non-display area IA. However, the present disclosure is not limited thereto, and may be connected to the touch electrode disposed in the display area AA or may be connected to the touch electrode disposed in the display area AA or the non-display area IA with a different configuration therebetween.

In an embodiment, the guard line 105 may be disposed to surround the periphery of the display area AA as shown. More specifically, the guard line 105 may be disposed to surround three sides of the display area AA except for the side facing the touch driving circuit 113 among the four sides. In FIG. 1, both ends of the guard line 105 are illustrated to be connected to the touch driving circuit 113, however, the present disclosure is not limited thereto, and the guard line 105 may be connected to another component (e.g., a component forming a ground) of the display device 100.

In an embodiment, the guard line 105 may be disposed to be spaced apart from the touch line by a first distance. Specifically, in the case that the side of the display area AA adjacent to a first area (or routing line area) 110 is a first side, the guard line 105 may be disposed to be spaced apart from the touch line corresponding to the first side by a first distance at the first side. The guard line 105 may be disposed outside the touch line. That is, the guard line 105 may be disposed to have a greater distance from the display area AA than the touch line, but is not limited thereto.

In an embodiment, the guard line 105 may physically block noise affecting the display device 100. The noise blocked by the guard line 105 may include noise generated by a specific configuration of the display device or noise applied from the outside of the display device 100. Here, the noise blocked by the guard line 105 may include noise generated by a different configuration of the display device 100 which is distinct from the guard line 105. The noise applied from the outside of the display device 100 may include noise applied by an external device connected to the display device 100. In some cases, the guard line 105 may prevent a parasitic capacitance from being formed between various lines disposed in the first area 110.

In the embodiment, the guard line 105 may be made of metal so that both ends thereof may be connected to the touch driving circuit 113. In this case, a terminal of the touch driving circuit 113 to which the guard line 105 is connected may be different from a terminal of the touch driving circuit 113 to which the noise sensing line 107, which will be described later, is connected. For example, the terminal to which the guard line 105 is connected may correspond to a terminal performing a function of emitting an input to the outside, and a terminal to which the noise sensing line 107 is connected may correspond to an input terminal for inputting a signal to the touch driving circuit 113 for operation.

In another embodiment, the guard line 105 may be not connected to the touch driving circuit 113, but may be connected to other components which act as a ground. Accordingly, noise blocked by the guard line 105 may be removed without affecting other configurations of the display device 100.

In an embodiment, the noise sensing line 107 may be disposed to be spaced apart from the touch line by a second distance. The second distance may be greater than the first distance, which is a separation distance between the touch line and the guard line 105. In this case, the noise sensing line 107 may be disposed outside the guard line 105.

In an embodiment, the noise sensing line 107 may be disposed on two opposite sides of the four sides of the display area AA. In the case that the noise sensing line 107 is disposed on a first side and a second side, a touch line related to the first side on which the noise sensing line 107 is disposed may correspond to the first touch line 101, and a touch line related to the second side on which the noise sensing line 107 is disposed may correspond to the second touch line 103.

In an embodiment, the noise sensing line 107 may be disposed parallel to each of the first side and the second side of the display area AA. One end of the noise sensing line 107 disposed on the first side may be connected to the touch driving circuit 113, and the other end may be independently disposed (or not connected to other components). One end of the noise sensing line 107 disposed on the second side may be connected to the touch driving circuit 113 and the other end may be independently disposed.

In an embodiment, the noise sensing line 107 may identify a noise signal. In detail, the noise sensing line 107 may identify a noise signal related to noise generated in response to a driving signal of the display device 100 being provided through the driving signal line. Here, the driving signal may include a synchronization signal (or a synchronization clock signal) for driving the display device 100. The driving signal may include a signal for executing various functions of the display device 100 generated by a device driving circuit or a device driver (or drive integrated circuit (D-IC) (not shown)) for a display panel of the display device 100. In one embodiment, the noise sensing line 107 may identify a noise signal generated by or caused by a driving signal of the display device 100 being provided through the driving signal line.

Here, the device driving circuit may be configured to control driving of pixels disposed in the display area AA. The device driving circuit may include at least one of a gate driver and a source driver.

In an embodiment, a plurality of gate lines and a plurality of data lines may be disposed on the panel (or display panel) of the display device 100, and sub-pixels may be disposed in a region adjacent to where the gate line and the data line overlap. For example, in the case of the display device 100 having a resolution of 2,160×3,840, 2,160 gate lines and 3,840 data lines may be provided, and sub-pixels are respectively disposed adjacently at overlapping locations of the gate lines and the data lines.

The gate driver may be controlled by a timing controller, and by sequentially outputting scan signals to a plurality of gate lines disposed in the display device 100, a driving timing for a plurality of sub-pixels is controlled. For example, in the display device 100 having a resolution of 2,160×3,840, the case of sequentially outputting scan signals from a first gate line to a 2,160-th gate line with respect to 2,160 gate lines may be referred to a 2,160 phases driving.

In an embodiment, the gate driver may include one or more gate driver integrated circuits (GDICs), and may be located on only one side of the panel of the display device 100 or may be located on the both sides depending on the driving method. Alternatively, the gate driver integrated circuit may be embedded in a bezel area of the panel of the display device 100 to be implemented in the form of a gate-in-panel (GIP).

The data driver may receive image data from the timing controller and convert the received image data into analog data voltages. Then, the data deliver outputs a data voltage to each data line according to a timing when a scan signal is applied through the gate line, so that each sub-pixel connected to the data line displays a light emitting signal having a corresponding brightness according to the data voltage.

In an embodiment, the data driver may include one or more source driver integrated circuits (SDICs), and the source driver integrated circuits may be connected to a bonding pad of the display device 100 or may be directly disposed on a panel of the display device 100 by a tape automated bonding (TAB) method or a chip-on-glass (COG) method.

In some cases, each source driver integrated circuit SDIC may be integrated and disposed on the panel of the display device 100. In addition, each source driver integrated circuit SDIC may be implemented in a chip-on-film (COF) method. In this case, each source driver integrated circuit SDIC may be mounted on a circuit film and may be electrically connected to the data line DL of the display panel 110 through the circuit film.

The timing controller 140 supplies various control signals to the gate driving circuit 120 and the data driving circuit 130, and controls the operations of the gate driving circuit 120 and the data driving circuit 130. That is, the timing controller 140 controls the gate driving circuit 120 to output the scan signal SCAN according to the timing implemented in each frame, and converts the image data received from the outside to match the data signal format used by the data driving circuit 130 and transmits the converted image data DATA to the data driving circuit 130.

In an embodiment, the noise sensing line 107 may be disposed on the same plane as at least one of the touch line, the guard line 105, and the ground line 109. For example, the noise sensing line 107 may be disposed in a first layer together with at least one of the touch line, the guard line 105 and the ground line 109. The driving signal line may be disposed in a second layer which is distinct from the first layer. In this case, the second layer may be a layer positioned below the first layer. The more specific examples related thereto may be further referred to FIGS. 2 and 3.

In an embodiment, the ground line 109 may be disposed to surround the display area AA outside the noise sensing line 107. The ground line 109 may be disposed to be spaced apart from the first touch line 101 or the second touch line 103 by a third distance in the non-display area IA. The third distance may be greater than a first distance which is a separation distance between the touch line and the guard line 105 or a second distance which is a separation distance between the touch line and the noise sensing line 107.

In an embodiment, both ends of the ground line 109 may be connected to the touch driving circuit 113. Specifically, as illustrated, the ground line 109 may surround three sides of the display area AA, and both ends thereof may extend in the direction towards the touch driving circuit 113 so as to be connected to the touch driving circuit 113.

In the embodiment, the first area 110 may correspond to a routing line area including at least a portion of the first touch line 101, the guard line 105, the noise sensing line 107 and the ground line 109. The lines shown in FIG. 1 are lines disposed in the first layer, and the configuration disposed below the first layer may be omitted from FIG. 1.

In an embodiment, a chip-on-panel (COP) area and a flexible printed circuit board (FPCB) area may be sequentially disposed at the lower end of the front portion of the display device as shown in FIG. 1. However, the present disclosure is not limited thereto, and one of the COP area and the FPCB area may be omitted or replaced with another configuration.

Although the COP area is shown in FIG. 1, the term is not limited thereto, and the COP area may be replaced with a chip-on-film (COF) area according to an embodiment.

In an embodiment, a device driving circuit may be mounted in the COP area. However, the present disclosure is not limited thereto, and the device driving circuit may be mounted on the FPCB area or the panel of the display device 100.

In an embodiment, at least one of the lines of FIG. 1 may extend to the FPCB area through the COP area. Specifically, for example, a touch line (e.g., the first touch line 101 and the second touch line 103), the guard line 105, the noise sensing line 107, the ground line 109, and the driving signal line (not shown) may extend to the FPCB area through the COP area, and may be connected to the touch driving circuit 113 disposed in the FPCB area.

In an embodiment, the touch driving circuit 113 may be disposed in the FPCB area. However, the present disclosure is not limited thereto, and in some cases, the touch driving circuit 113 may be disposed to correspond to the COP area.

Figure 2:
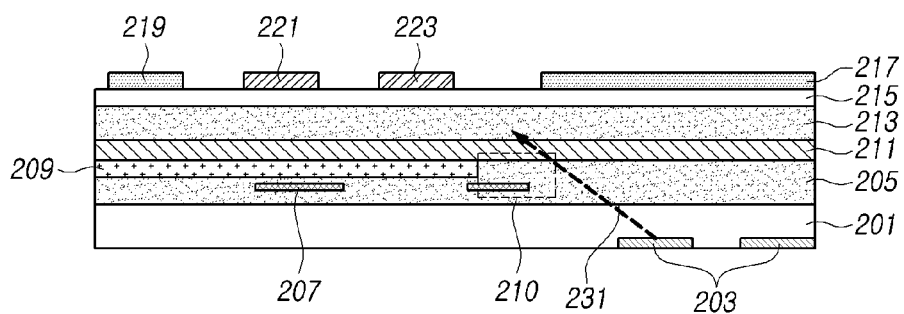
FIG. 2 conceptually illustrates an example of a cross-section of a display device according to an embodiment of the present disclosure.

FIG. 2 conceptually illustrates an example of a cross-section of a display device according to an embodiment of the present disclosure. Specifically, FIG. 2 is a diagram for explaining an example of a cross-section AA' of the first area 110 of FIG. 1.

Referring to FIG. 2, the display device may include a driving signal line 203, an anode 207, a cathode 209, a touch line 219, a guard line 221, a noise sensing line 223 and a ground line 217.

The driving signal line 203 may be disposed in a first layer 201. The anode 207 and the cathode 209 may be disposed in a second layer 205. In this case, according to an embodiment, the cathode 209 may be formed so as not to overlap the ground line 217. That is, the cathode 209 may not extend to the first area 210. Accordingly, the cathode 209 may not overlap (or cover) the ground line 217 disposed on one end of the first area 210. In this case, noise generated by the driving signal line 203 may pass through the first area 210 and be directed to at least one of the touch line 219, the guard line 221 and the noise sensing line 223. Specifically, for example, noise may be transmitted to at least one of the touch line 219, the guard line 221 and the noise sensing line 223 through a first path 231. It should be understood that the first layer 201 and the second layer 205 as shown in FIG. 2 do not correspond to the first layer in which the noise sensing line 107, the touch line, the guard line 105 or the ground line 109 are disposed, and the second layer in which the driving signal line is disposed as mentioned above.

In an embodiment, the noise sensing line 223 may be disposed between the guard line 221 and the ground line 217 to detect a noise signal generated by the driving signal line 203. The detected noise signal may be transmitted to a touch driving circuit (e.g., the touch driving circuit 113 of FIG. 1). The touch driving circuit may identify information on the noise signal in response to the noise signal being received. The identified information on noise signal may be stored in a memory of the display device. As will be described later, the touch driving circuit may correct a touch input signal based on information on the noise signal to more accurately determine the position of the touch input.

In an embodiment, the ground line 217 may have a greater width than the touch line 219, the guard line 221, and the noise sensing line 223. However, the present disclosure is not limited thereto, and the size of widths of the lines may be changed according to embodiments.

In an embodiment, the touch line 219 may correspond to at least one of the touch lines arranged in a plurality of columns. For example, the touch line 219 may correspond to the first touch line 101 of FIG. 1. However, this may be because FIG. 2 is a cross-section of the area in which the first touch line 101 of FIG. 1 is disposed.

If FIG. 2 is a cross-section of an area in which the second touch line 103 of FIG. 1 is disposed, the touch line 219 may be replaced with the second touch line 103 of FIG. 1. However, in this case, the positions of the remaining components of FIG. 2 may be changed to be symmetrical with respect to a vertical axis. For example, the arrangement may be symmetrically changed so that the ground line 217, the noise sensing line 223, the guard line 221 and the touch line 219 are sequentially positioned from the left. However, in this case, the location of the components is changed, but the function, form, arrangement, etc., may be the same.

Referring to FIG. 2, a third layer 211, a fourth layer 213, and a fifth layer 215 may be disposed on the second layer 205. The third layer 211 may correspond to an encapsulation layer, and the fourth layer 213 may correspond to a particle cover layer (PCL). The fifth layer 215 may correspond to a buffer and an inter-layer (ILD). However, the present disclosure is not limited thereto, and according to embodiments, at least some of the third layer 211, the fourth layer 213 and the fifth layer 215 may be omitted or another layer may be added.

In an embodiment, the layers in which the touch line 219, the guard line 221, the noise sensing line 223, and the ground line 217 disposed on the fifth layer 215 are located may be referred to as another layer, for example, a sixth layer distinct from the first to fifth layers.

In an embodiment, at least some of the touch line 219, the guard line 221, the noise sensing line 223 and the ground line 217 may be connected to the touch driving circuit. For example, one end of each of the touch line 219, the guard line 221, the noise sensing line 223 and the ground line 217 may be connected to the touch driving circuit. For another example, both ends of the touch line 219, the guard line 221 and the ground line 217 may be connected to the touch driving circuit, and one end of the noise sensing line 223 may be connected to the touch driving circuit. The touch driving circuit is a circuit responsible for driving the touch function of the display device and may be referred to as another term, for example, a touch integrated circuit (IC), but is not limited thereto.

In an embodiment, a driving signal line 203 may be connected to a device driving circuit. The device driving circuit is a circuit responsible for overall driving of the panel (or display panel) of the display device, and may be referred to as a drive integrated circuit (D-IC). In this case, the noise by the driving signal line 203 may be generated corresponding to the operation of the display device according to the operation of the D-IC. For example, the noise may be periodically generated by a clock signal to synchronize various components of the display device.

Figure 3:
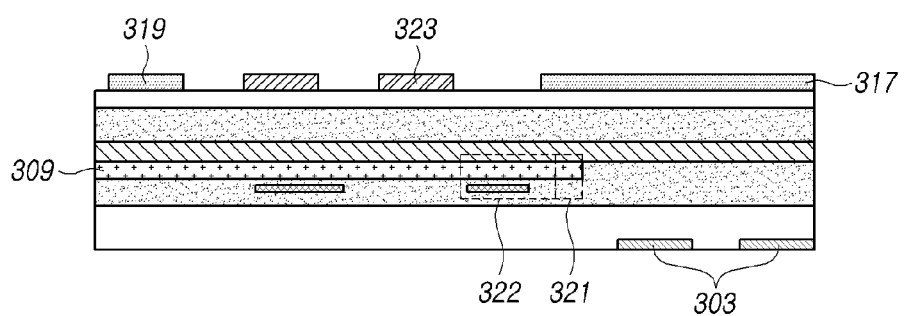
FIG. 3 conceptually illustrates another example of a cross-section of a display device according to an embodiment of the present disclosure.

FIG. 3 conceptually illustrates another example of a cross-section of a display device according to an embodiment of the present disclosure. Specifically, FIG. 3 is a diagram for explaining another example of a cross-section AA' of the first area 110 of FIG. 1. Hereinafter, in FIG. 3, it will be omitted the content overlapping with the content described with reference to FIG. 2.

Referring to FIG. 3, a cathode 309 of the display device may extend to overlap a ground line 317. The cathode 309 may extend to at least a portion of the area of the second layer corresponding to the area of the first layer in which the ground line 317 is disposed. In more detail with reference to FIG. 3, the area of the first layer in which the ground line 317 is disposed may correspond to the area in which the ground line 317 is disposed in FIG. 3. In this case, at least a portion of the area of the second layer corresponding to the area of the first layer in which the ground line 317 is disposed, in which the cathode 309 is extended and disposed, may correspond to a first area 321.

In an embodiment, the cathode 309 may be disposed in the area of the second layer corresponding to the area between the noise sensing line 323 and the ground line 317, that is, in a second area 322. That is, the cathode 309 may be disposed to overlap an area between the noise sensing line 323 and the ground line 317.

In an embodiment, in the case that the cathode 309 extends to overlap the ground line 317, noise generated by the driving signal line 303 may be blocked by the cathode 309 in the second layer. In some cases, if the noise reaches a layer higher than the second layer beyond the cathode 309, the noise may be detected by the noise sensing line 323.

FIG. 3 illustrates a case in which another layer is disposed between at least a portion of the cathode 309 and at least a portion of the ground line 317, which are overlapped, but the present disclosure is not limited thereto.

According to an embodiment, the embodiment of FIG. 2 and the embodiment of FIG. 3 may be complexly applied to a display device. For example, the front right area of the display device may be implemented to correspond to the embodiment of FIG. 2, and the front left area of the display device may be implemented to correspond to the embodiment of FIG. 3. In addition, in some cases, there may be implemented in a configuration other than the configuration described with reference to FIG. 3. For example, the position, the material, the size, etc., of the guard line and the anode may be changed in various forms.

In an embodiment, the cathode 309 and the anode may be an element related to a pixel disposed in the display area AA. For example, as the cathode 309 and the anode extend from the display area AA to the non-display area IA, they may be an element disposed under at least a portion of the touch line 319, the guard line and the noise sensing line 323. In some cases, at least a portion of the cathode 309 and the anode may be omitted or replaced with another configuration.

Figures 4A, 4B:
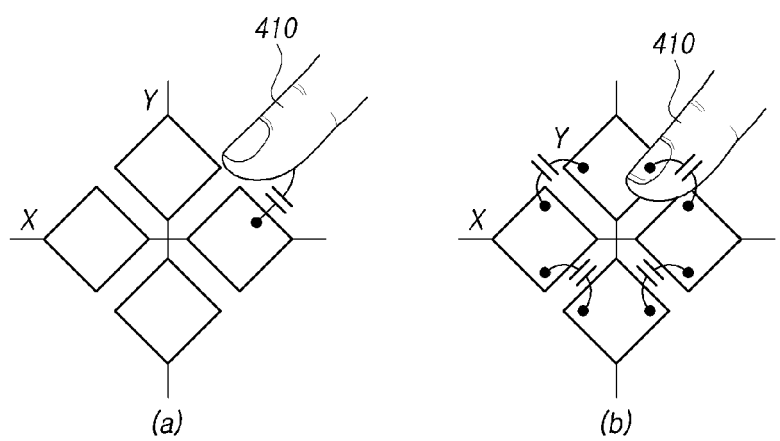
FIGS. 4A and 4B are diagrams for explaining a touch input method used in a display device according to an embodiment of the present disclosure.

FIGS. 4A and 4B are diagrams for explaining a touch input method used in a display device according to an embodiment of the present disclosure. For example, FIG. 4A is for describing a self-capacitive method among touch input methods, and FIG. 4B illustrates a mutual-capacitive method among touch input methods.

According to the self-capacitive method shown in FIG. 4A, if a touch input 410 is applied, the display device sequentially transmits a driving signal to the electrodes corresponding to the X-axis and the Y-axis and sequentially senses so as to identify an electrode (or information on an electrode (e.g., location information)) to which the touch input 410 is applied. Specifically, a default capacitance may be preset to each of the electrode corresponding to the X-axis and the electrode corresponding to the Y-axis. In this case, when a touch input 410 is applied to a specific electrode, there may be occurred a change in capacitance. The display device may sequentially identify the electrode corresponding to the X-axis and the electrode corresponding to the Y-axis to detect the change in capacitance, and may determine the location of the touch input 410 based on the identification result.

In the present disclosure, for convenience of explanation, an electrode corresponding to the X-axis will be referred to as a transmission line (Tx), and an electrode corresponding to the Y-axis will be referred to as a reception line (Rx), but embodiments are not limited to these terms.

According to the mutual-capacitive method shown in FIG. 4B, the display device may identify the touch position using a change in capacitance generated between a transmission line and a reception line. Specifically, in a touch electrode (or sensor) of the mutual-capacitive method, the electric field generated at the transmission line may be absorbed by the finger, so that the mutual capacitance between the transmission line and the reception line may decrease. In this case, the signal of the transmission line may be transmitted to the reception line by coupling between the transmission line and the reception line. Accordingly, when a signal is applied to the transmission line, the display device may detect a change in capacitance at the reception line and identify the position of the touch input 410.

In an embodiment, in the case of the mutual-capacitive method, the driving signal line may be disposed at both positions corresponding to the transmission line and the reception line, respectively. In this case, a first noise may be applied by the driving signal line while the driving signal is transmitted through the transmission line, and a second noise may be applied by the driving signal line while the touch input signal is transmitted through the reception line. That is, in the case of the mutual-capacitive method, the touch input signal is checked through the reception line, and the checked touch input signal may be affected by the first noise and the second noise. Accordingly, the display device can perform a noise removal operation by distinguishing the self-capacitive method and the mutual-capacitive method, and a detailed description thereof will be provided later.

In an embodiment, the display device may use the self-capacitive method and the mutual-capacitive method together to identify the touch input 410. For example, in one frame for sensing the touch input 410, touch sensing based on the self-capacitive method and touch sensing based on the mutual-capacitive method may be sequentially performed.

Figure 5:
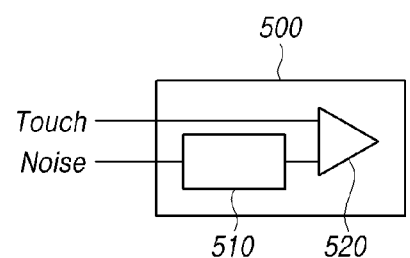
FIG. 5 is a diagram for explaining a touch driving circuit of a display device according to an embodiment of the present disclosure.

FIG. 5 is a diagram for explaining a touch driving circuit of a display device according to an embodiment of the present disclosure. Hereinafter, The terms of '~unit' or '~er' may mean a unit for processing at least one function or operation, which may be implemented as hardware or software, or a combination of hardware and software. That is, the terms "unit" or "~er" (e.g., data driver, gate driver, noise detector, guarder, inverter, or the like) may include any electrical circuitry, features, components, an assembly of electronic components or the like. In particular, the terms "unit" or "~er" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the terms "unit" or "~er." In some embodiments, the various units described herein may be included in or otherwise implemented by processing circuitry such as a microprocessor, microcontroller, or the like.

Referring to FIG. 5, a touch driving circuit 500 may include an inverter 510 and an operation unit 520. The inverter 510 may be implemented by an arithmetic device including a microprocessor, which is also the same in an operation unit 520 to be described later. In addition, according to an embodiment, other components may be included in the touch driving circuit 500 other than the configuration shown in FIG. 5, or some components may be omitted. In addition, at least one of the inverter 510 and the operation unit 520 may be configured to be distinguished from the touch driving circuit 500 according to an embodiment.

Referring to FIG. 5, the inverter 510 may receive a noise signal. In this case, the noise signal is transmitted from the noise sensing line, and may include a signal detected by the noise sensing line among noise generated from the driving signal line.

More specifically, the noise signal is a signal generated as a reaction to a signal for driving the display device when a signal for driving the display device is transmitted to that particular specific configuration of the display device through the driving signal line, and may act as noise around the driving signal line. Namely, each different design of a display will have a configuration that is specific to that particular display, based on its design parameters. Thus, the generated noise might be different for one specific configuration as compared to a different configuration. The noise signal generated by the driving signal line is generated from a lower layer (e.g., the first layer 201 of FIG. 2) of the display device on which the driving signal line is disposed, and may be transferred to an upper layer of the display device (e.g., the fifth layer 215 of FIG. 2).

In an embodiment, the inverter 510 may invert the received signal. For example, the inverter 510 may invert the signal to '−1' when receiving a signal of '+1.' As another example, the inverter 510 may invert the received noise signal. In this case, the waveform of the noise signal may be changed to an inverted state. Therefore, the signal waveform which is identified before the noise signal is input to the inverter 510, that is, the waveform of the noise signal identified at an input terminal of the inverter 510 may be identified in an inverted form at an output terminal of the inverter 510.

In an embodiment, the inverter 510 may invert the noise signal to transmit to the operation unit 520. Accordingly, the inverted noise signal may be provided from the inverter 510 to the operation unit 520.

In an embodiment, the operation unit 520 may receive a touch input signal from the touch line. The touch input signal is a signal identified through the touch electrode as the touch input is applied, and may be received by the operation unit 520 through the touch line. The signal received by the operation unit 520 may include a signal received from at least one of the first touch line 101 and the second touch line 103 of FIG. 1.

For example, in the case of the touch input method being a self-capacitive method, the operation unit 520 may receive a touch input signal from at least one of the transmission lines (e.g., the first touch line 101 of FIG. 1) and at least one of the reception lines (e.g., the second touch line 103 of FIG. 1).

As another example, the operation unit 520 may receive a touch input signal from at least one of the reception lines (e.g., the second touch line in FIG. 1) based on the touch input method being the mutual-capacitive method.

In an embodiment, the operation unit 520 may receive the inverted noise signal from the inverter 510 as described above. In this case, the operation unit 520 may correct the touch input signal by calculating the touch input signal and the inverted noise signal. For example, the operation unit 520 may subtract the noise signal from the touch input signal by adding the touch input signal and the inverted noise signal. Accordingly, the touch input signal may be corrected to not include the noise signal. The more detailed description of subtracting a noise signal from a touch input signal will be referred to FIG. 6.

In an embodiment, the operation unit 520 may receive a touch input signal from each of the first touch line, which is one of the transmission lines, and the second touch line, which is one of the reception lines, based on the self-capacitive method. In this case, the operation unit 520 may subtract a noise signal from each of a first touch input signal corresponding to the first touch line and a second touch input signal corresponding to the second touch line to acquire a corrected first touch input signal and a corrected second touch input signal. The operation unit 520 may identify the position information to which the touch input is applied by using the corrected first touch input signal and the corrected second touch input signal.

In an embodiment, the operation unit 520 may receive a touch input signal from a second touch line which is one of the reception lines based on the mutual-capacitive method. In this case, the operation unit 520 may obtain the corrected second touch input signal by subtracting the noise signal from the second touch input signal corresponding to the second touch line. In this case, the subtracted noise signal may correspond to the sum of the noise signals obtained through each of the noise sensing line disposed in the area corresponding to the second touch line and the noise sensing line disposed in the area corresponding to the first touch line. In this case, both the noise signal added while the driving signal is applied to the touch electrode through the transmission line and the noise signal added while the touch input signal is received from the touch electrode to the operation unit 520 through the reception line may be removed. The operation unit 520 may identify the position information to which the touch input is applied by using the corrected second touch input signal.

In an embodiment, the self-capacitive method and the mutual-capacitive method may be mixed and used in one frame in relation to the sensing of a touch input. In this case, the operation of the inverter 510 and the operation unit 520 for removing the noise signal from the touch input signal as above-described may be performed for each of the self-capacitive method and the mutual-capacitive method. Accordingly, the corrected touch input signal may be obtained from the self-capacitive method and the mutual-capacitive method, respectively.

In this case, if the corrected touch input signal based on the self-capacitive method is referred to as a first correction signal and the corrected touch input signal based on the mutual-capacitive method is referred to as a second correction signal, the operation unit 520 may obtain a third correction signal for finally identifying the touch input by using the first correction signal and the second correction signal. For example, an average of the first correction signal and the second correction signal may be calculated and obtained as the third correction signal. A method of obtaining the third correction signal is not limited to an average calculation method, and various methods may be used.

In an embodiment, the touch driving circuit 500 may use the corrected touch input signal to identify the position of the touch input. Various known techniques may be used to identify the position or location of the touch input using the corrected touch input signal, and a detailed description thereof will be omitted.

Figure 6:
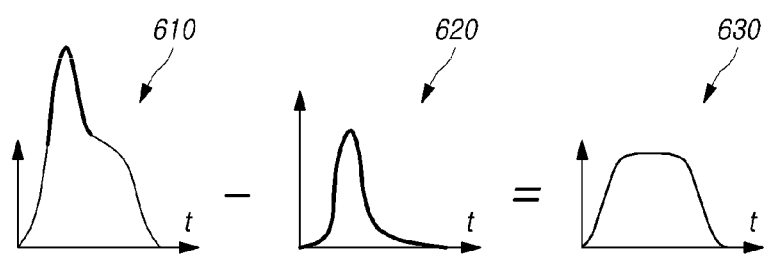
FIG. 6 is a diagram for explaining an operation of identifying information on a touch input of a display device according to an embodiment of the present disclosure.

FIG. 6 is a diagram for explaining an operation of identifying information on a touch input of a display device according to an embodiment of the present disclosure. Specifically, FIG. 6 is a diagram for explaining an operation process of identifying a corrected touch input signal 630 by subtracting a noise signal 620 from a touch input signal 610.

In an embodiment, a touch input signal 610 may be identified through a touch electrode and a touch line. For example, in the self-capacitive method, the touch input signal 610 may be acquired through least one (e.g., the first touch line 101 of FIG. 1) of touch lines (or transmission lines (Tx)) arranged in columns and at least one (e.g., the second touch line 103 of FIG. 1) of touch lines (or reception lines (Rx)) arranged in rows. For another example, in the mutual-capacitive method, the touch input signal 610 may be obtained through at least one of the reception lines. In some cases, the touch input signal 610 may include a noise signal. In this case, it is beneficial to remove the noise signal in order to more accurately identify the position of the touch input.

In an embodiment, a noise signal 620 may be identified through a noise sensing line. The noise signal 620 identified through the noise sensing line may include at least a portion of noise generated from the driving signal line. For example, the noise signal 620 may include noise reaching a layer in which the noise sensing line and the touch line are disposed among noise generated from the driving signal line.

In an embodiment, one noise sensing line may be disposed in each of the left bezel area and the right bezel area of the display device. One noise sensing line disposed in each of the left bezel area and the right bezel area may be used to correct the touch input signal.

For example, in the case that the touch input method is the self-capacitive method, the noise sensing line in the right bezel area may be used to correct the touch input signal identified through a first touch line. The noise sensing line in the left bezel area may be used to correct a touch input signal identified through a second touch line. As another example, in the case that the touch input method is a mutual-capacitive method, noise identified through the noise sensing lines in each of the left bezel area and the right bezel area may be used to correct a touch input signal identified through the second touch line. In this case, the noise used for correction may be the sum of noises identified through the noise sensing lines in each of the left bezel area and the right bezel area.

In an embodiment, the display device (or the touch driving circuit) may remove a component corresponding to the noise signal 620 of the touch input signal 610 by subtracting the noise signal 620 from the touch input signal 610. Accordingly, there may be acquired a corrected touch input signal 630.

In an embodiment, the noise sensing line may include a first noise sensing line corresponding to a first touch line (or a transmission line (Tx)) arranged in columns and second noise sensing line corresponding to the second touch line (or the reception line (Rx)) arranged in rows. In this case, the display device may obtain the corrected touch input signal 630 by removing the noise signal 620 identified through the noise sensing line from the touch input signal 610 for each touch input signal 610.

In an embodiment, the self-capacitive method and the mutual-capacitive method may be mixed and used in one frame in connection with the sensing of a touch input. In this case, the operation of removing the noise signal 620 shown in FIG. 6 may be performed for each of the self-capacitive method and the mutual-capacitive method. Accordingly, the corrected touch input signal may be obtained from the self-capacitive method and the mutual-capacitive method, respectively. If the corrected touch input signal based on the self-capacitive method is referred to as a first correction signal and the corrected touch input signal based on the mutual-capacitive method is referred to as a second correction signal, a third correction signal for finally identifying the touch input may be obtained by using the first correction signal and the second correction signal. For example, the average of the first correction signal and the second correction signal may be calculated, and the averaged signal may be obtained as the third correction signal.

Figure 7:
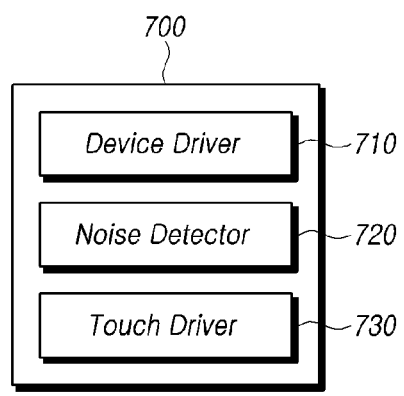
FIG. 7 is a functional block diagram of a display device according to an embodiment of the present disclosure.

FIG. 7 is a functional block diagram of a display device according to an embodiment of the present disclosure.

Referring to FIG. 7, the display device 700 may include a device driver 710 (also referred to as a drive integrated circuit 710), a noise detector 720 (also referred to as a noise detector circuit 720), and a touch driver 730 (also referred to as touch driver circuit 730).

The device driver 710 may be implemented by an arithmetic device including a microprocessor, which is the same in the noise detector 720 and the touch driver 730, which will be described later. In addition, according to an embodiment, other components may be included in the display device 700 in addition to the components illustrated in FIG. 7, or some components may be omitted. In addition, at least one of the device driver 710, the noise detector 720 and the touch driver 730 may be configured to be distinguished from the display device 700 according to an embodiment.

The device driver 710 may control the overall operation of the display device 700, and may include a configuration related to the operation of the display device 700. For example, the device driver 710 may include a main processor and a driving signal line of the display device 700. In an embodiment, the device driver 710 may generate a driving signal. The device driver 710 may control the display device 700 by transmitting a driving signal to each component of the display device 700 through a driving signal line.

In an embodiment, noise (or noise signal) may be generated in response to generation of the driving signal by the device driver 710. For example, when the driving signal generated by the device driver 710 is transmitted to a specific configuration of the display device 700 to be driven through the driving signal line, noise may be transmitted to the periphery of the driving signal line and may have an effect that is different for each specific configuration. In this case, noise may be detected by a noise detector 720 to be described later.

The noise detector 720 is configured to detect noise generated in relation to a driving signal, and may include a noise sensing line. For example, the noise detector 720 may detect noise generated when a driving signal generated by the device driver 710 is transmitted. For another example, the noise detector 720 may detect noise that is generated under the touch line and affects the touch line, which is difficult to be physically blocked by a guard line.

In an embodiment, the noise sensing line may include a first noise sensing line and a second noise sensing line. The noise detector 720 may detect a first noise through a first noise sensing line and detect a second noise through a second noise sensing line. In this case, the first noise sensing line may be a line disposed on the side of the touch line (e.g., the transmission line (Tx)) arranged in columns, and the second noise sensing line may be a line disposed on the side of the touch line (e.g., the reception line (Rx)) arranged in rows.

In an embodiment, the first noise may be used to correct a touch input signal identified through a first touch line as one of touch lines (hereinafter, transmission lines) arranged in columns. The second noise may be used to correct a touch input signal identified through a second touch line which is one of touch lines (hereinafter, reception lines) arranged in rows. In another embodiment, the first noise and the second noise may be used to correct a touch input signal identified through the second touch line.

The touch driver 730 is a component for detecting a touch input received by the display device 700, and may include a component related to a touch function. For example, the touch driver 730 may include a touch electrode, a touch line, and a touch configuration circuit. Here, the touch line may include a transmission line for transmitting a driving signal of a touch function to the touch electrode and a reception line for receiving a touch input signal (or a sensing signal) for sensing a touch input from the touch electrode. However, in the case of the self-capacitive method, each of the transmission line and the reception line may perform both transmission and reception of the touch driving signal. That is, the transmission line and the reception line may perform both the transmission of the driving signal and the sensing of the touch input signal, except that only the position of the touch electrode to be sensed is different. Therefore, the embodiment is not limited to the terms of the transmission line and the reception line.

In an embodiment, the touch driver 730 may identify a touch input signal to the display device 700 in response to a touch input to the display device 700. The identified touch input signal may include at least a portion of a noise signal generated by the driving signal.

In an embodiment, the touch driver 730 may identify information on the touch input based on the touch input signal and the noise signal. The touch driver 730 may identify information on the touch input based on a signal obtained by subtracting the noise signal from the touch input signal. Here, the information on the touch input may include information on the position of the touch input.

For example, the touch driver 730 may identify the noise signal from the noise detector 720. The touch driver 730 may correct the touch input signal by subtracting the noise signal from the touch input signal. The touch driver 730 may identify a position corresponding to the corrected touch input signal as a position to which the touch input is applied.

In an embodiment, the display device 700 may further include a guarder or a guard unit. The guard unit may include a guard line as a configuration for physically blocking a noise signal. The guard line may include a guard line disposed between the noise sensing line included in the noise detector 720 and the touch line included in the touch driver 730.

FIG. 8 is a diagram illustrating a flow for each step of operating a display device according to an embodiment of the present disclosure. Each step of the method of operating the display device illustrated in FIG. 8 may be performed in a different order from that illustrated in the drawing in some cases. Also, in the following, it will be omitted the content overlapping with the previously described content.

In step 810, a touch input signal may be identified in response to a touch input to the display device. The display device may transmit a driving signal for a touch electrode to the touch electrode through a touch line. The display device may detect a touch input signal based on the driving signal when a touch input is applied. The display device may identify the detected touch input signal through the touch line. In this case, a line transmitting a driving signal may be referred to as a transmission line and a line transmitting a detected touch input signal may be referred to as a reception line, but embodiments are not limited thereto.

In step 820, a noise signal related to the driving signal of the display device may be identified using a noise sensing line disposed in a non-display area of the display device. The driving signal for driving the display device may be transmitted to various components of the display device through a driving signal line. As described above, noise may be generated in response to the transmission of the driving signal, and the noise sensing line may sense the generated noise signal. For example, one noise sensing line may be disposed on the left and right sides of the display area, respectively. In this case, a noise signal can be identified from each noise sensing line.

In an embodiment, the noise sensing line may be disposed in the non-display area. For example, the noise sensing line may be disposed between a touch line and a ground line disposed in the non-display area.

In some cases, the display device may further include a guard line disposed outside the touch line and disposed to surround the side and upper surfaces of the display area of the display device. The guard line may physically block noise. Both ends of the guard line may be connected to the touch driving circuit. In this case, a terminal of the touch driving circuit connected to the guard line may be a terminal forming a ground. That is, the guard line may be connected to a separate configuration from a terminal (hereinafter, an input terminal) for receiving information of the touch driving circuit.

The noise sensing line may be arranged in two lines to be distinguished from each other on opposite side surfaces of the display area of the display device so that one end of each is connected to the touch driving circuit. For example, a first line of the noise sensing lines may be linearly disposed on a first surface (or first side) of the display device, and one end thereof may be connected to the touch driving circuit. A second line of the noise sensing lines may be linearly disposed on a second surface (or second side) of the display device facing the first surface, and one end thereof may be connected to the touch driving circuit. In this case, a terminal of the touch driving circuit connected to the noise sensing line may include an input terminal. Accordingly, a noise signal received through the noise sensing line may be processed by the touch driving circuit.

In an embodiment, the noise sensing line may be disposed between the guard line and a ground line to detect noise. For example, the noise sensing line may be positioned between the guard line and the ground line sequentially positioned outside the display area.

In step 830, information on a touch input may be identified based on a touch input signal and a noise signal. The display device may acquire a corrected touch input signal by removing a noise signal from the touch input signal. The display device may identify information on the touch input based on the acquired touch input signal. Here, the information on the touch input may include information on the position to which the touch input is applied, but is not limited thereto, and may include various information related to the touch input, such as the number of times of the touch input, a time length at which the touch input is maintained, and information on a magnitude of the touch input.

In an embodiment, in the case that the touch input method is a self-capacitive method, the display device may correct a touch input signal received from a first touch line based on a noise signal received from the noise sensing line (hereinafter, referred to as a first noise sensing line) disposed adjacent to the first touch line. The display device may correct a touch input signal received from a second touch line based on the noise signal received from the noise sensing line (hereinafter, referred to as the second noise sensing line) disposed adjacent to the second touch line.

For example, the display device may perform correction based on subtracting a noise signal received through the first noise sensing line from a touch input signal received from the first touch line. The display device may perform correction based on subtracting a noise signal received through the second noise sensing line from the touch input signal received from the second touch line.

In another embodiment, if the touch input method is the mutual-capacitive method, the display device may identify a touch input signal through the second touch line in response to transmitting a touch driving signal through the first touch line. The display device may perform correction based on subtracting a noise signal received through the first noise sensing line and the second noise sensing line from the identified touch input signal.

According to an embodiment of the present disclosure, information on a touch input may be more accurately identified by detecting noise using a noise sensing line and correcting a touch input signal.

A display device with a touch function according to an embodiment of the present disclosure may include a touch line connected to a touch electrode disposed in a display area of the display device, a noise sensing line disposed to be spaced apart from the touch line by a first distance in a non-display area of the display device, a driving signal line for providing a driving signal of the display device in the non-display area, and a touch driving circuit for identifying information on a touch input using a touch input signal obtained through the touch line and a noise signal obtained through the noise sensing line.

In an embodiment, the noise signal may include a signal related to noise generated in response to the driving signal being provided through the driving signal line.

In an embodiment, the driving signal may include a synchronization signal related to driving of the display device.

In an embodiment, the touch line and the noise sensing line may be disposed in a first layer, and the driving signal line may be disposed in a second layer under the first layer. In some cases, the display device may further include a cathode, and a ground line disposed to be spaced apart from the touch line by a second distance in the non-display area, wherein the second distance may be greater than the first distance. The cathode may be disposed in a third layer between the first layer and the second layer, and the ground line may be disposed in the first layer.

In an embodiment, the touch driving circuit may identify information on the touch input based on a signal obtained by removing the noise signal from the touch input signal.

In an embodiment, the information on the touch input may include information on a position of the touch input with respect to the display area.

In an embodiment, there may be further included a guard line disposed between the touch line and the noise sensing line.

In an embodiment, the guard line may physically block a noise signal generated by that particular specific configuration of the display device based on how it was designed or a noise signal applied from the outside of the display device. The specific configuration may be distinct from the driving signal line. It is appreciated that each different design of a display will have a different configuration that is specific to that particular display, based on its design parameters. The guard line might also be custom designed to block the noise for the specific configuration of the display in which it is used. In an embodiment, the touch line may include a line through which a driving signal for sensing the touch input is transmitted or a line through which a sensing signal by the touch input is received. The touch line may include at least one of a first touch line connected to at least one touch electrode arranged in a first direction in the display area and a second touch line connected to at least one touch electrode arranged in a second direction in the display area, and wherein at least a portion of the touch line may be disposed in the non-display area.

In an embodiment, the display device may further include a device driving circuit for driving the display device, wherein the touch line and the noise sensing line may be connected to the touch driving circuit, and the driving signal line may be connected to the device driving circuit.

In an embodiment, the cathode may be formed so as not to overlap the ground line.

In an embodiment, the cathode may be formed so as to overlap the ground line.

According to an embodiment of the present disclosure, a display device with a touch function may include: a device driver configured to generate a driving signal of the display device; a noise detector configured to identify a noise signal related to the driving signal using a noise sensing line disposed in a non-display area of the display device; and a touch driver configured to identify a touch input signal corresponding to a touch input to the display device, and to identify information on the touch input based on the touch input signal and the noise signal.

In an embodiment, the noise signal may be caused in response to the driving signal being generated by the device driver.

In an embodiment, the touch driver may identify information on the touch input based on a signal acquired by subtracting the noise signal from the touch input signal.

In an embodiment, there may be further included a guard unit or a guarder configured to physically block the noise signal.

The guarder may include a guard line disposed between the noise sensing line included in the noise detector and the touch line included in the touch driver.

An operating method of a display device according to an embodiment of the present disclosure may include: identifying a touch input signal corresponding to a touch input to the display device; identifying a noise signal related to a driving signal of the display device using a noise sensing line disposed in a non-display area of the display device; and identifying information on the touch input based on the touch input signal and the noise signal.

In an embodiment, the noise signal may include a signal related to noise caused in response to the driving signal.

In an embodiment, the identifying of the information on the touch input may include identifying the information on the touch input based on a signal obtained by removing the noise signal from the touch input signal. The information on the touch input may include position information of the touch input with respect to the display area.

In an embodiment, the information on the touch input comprises information on a position of the touch input with respect to a display area of the display device.

Although the embodiments of the present disclosure have been described in more detail with reference to the accompanying drawings, the present disclosure is not necessarily limited to these embodiments, and various modifications may be possible within the scope without departing from the technical spirit of the present disclosure. Accordingly, the embodiments disclosed in the present disclosure are not intended to limit the technical spirit of the present disclosure, but to exemplarily explain the present disclosure, and the scope of the technical spirit of the present disclosure is not limited by these embodiments. Therefore, there should be understood that the embodiments described above are illustrative in all respects and not restrictive. The protection scope of the present disclosure should be construed by the following claims, and all technical ideas within the scope equivalent thereto should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus with a touch function comprising:
   a touch line electrically connected to a touch electrode disposed in a display area of the display device;
   a noise sensing line disposed to be spaced apart from the touch line by a first distance in a non-display area of the display device;
   a guard line disposed between the touch line and the noise sensing line;
   a cathode disposed below the touch line, the noise sensing line, and the guard line;
   a driving signal line configured to provide a driving signal of the display device in the non-display area; and
   a touch driving circuit configured to identify information on a touch input using a touch input signal acquired through the touch line and a noise signal acquired through the noise sensing line,
   wherein the driving signal line does not overlap with the cathode from a plan view.

2. The display apparatus of claim 1, wherein the noise signal comprises a signal related to noise caused in response to the driving signal being provided through the driving signal line.

3. The display device of claim 1, wherein the driving signal comprises a synchronization signal related to driving of the display apparatus.

4. The display apparatus of claim 1, wherein the touch line and the noise sensing line are disposed in a first layer, and the driving signal line is disposed in a second layer under the first layer.

5. The display apparatus of claim 4, further comprising:
   a ground line disposed to be spaced apart from the touch line by a second distance in the non-display area,
   wherein the second distance is greater than the first distance.

6. The display apparatus of claim 5, wherein the cathode is disposed in a third layer between the first layer and the second layer, and the ground line is disposed in the first layer.

7. The display apparatus of claim 1, wherein the touch driving circuit identifies the information on the touch input based on a signal acquired by removing the noise signal from the touch input signal.

8. The display apparatus of claim 1, wherein the information on the touch input comprises information on a position of the touch input with respect to the display area.

9. The display apparatus of claim 1, wherein the guard line physically blocks a noise signal generated by a specific configuration of the display apparatus or a noise signal applied from an outside of the display apparatus.

10. The display apparatus of claim 1, wherein the touch line comprises at least one of a first touch line electrically connected to at least one touch electrode arranged in a first direction in the display area and a second touch line electrically connected to at least one touch electrode arranged in a second direction in the display area, and
    wherein at least a portion of the touch line is disposed in the non-display area.

11. The display apparatus of claim 1, further comprising a device driving circuit configured to drive the display apparatus,
    wherein the touch line and the noise sensing line are electrically connected to the touch driving circuit, and the driving signal line is electrically connected to the device driving circuit.

12. The display apparatus of claim 5, wherein the cathode does not overlap the ground line from a plan view.

13. The display apparatus of claim 5, wherein the cathode overlaps the ground line from a plan view.

14. A display apparatus with a touch function comprising:
- a drive integrated circuit electrically connected to a driving signal line, the drive integrated circuited configured to generate a driving signal of the display apparatus and provide the driving signal via the driving signal line;
- a noise detector configured to identify a noise signal related to the driving signal using a noise sensing line disposed in a non-display area of the display apparatus;
- a touch driver configured to identify a touch input signal corresponding to a touch input to the display apparatus, and to identify information on the touch input based on the touch input signal and the noise signal;
- a guard line disposed between the noise sensing line included in the noise detector and a touch line included in the touch driver, the guard line configured to block the noise signal;
- a ground line spaced apart from the touch line in the non-display area; and
- a light emitting diode electrically connected to the drive integrated circuit, the light emitting diode including an anode, a cathode, and a light emitting layer between the anode and the cathode,
- wherein the cathode of the light emitting diode extends to overlap the touch line, the guard line, and the noise sensing line from a plan view, and
- wherein the noise sensing line is disposed between the guard line and the ground line.

15. The display apparatus of claim 14, wherein the noise signal is caused in response to the drive signal being generated by the drive integrated circuit.

16. The display apparatus of claim 14, wherein the touch driver identifies the information on the touch input based on a signal acquired by subtracting the noise signal from the touch input signal.

17. An operating method of a display apparatus comprising:
- identifying a touch input signal corresponding to a touch input to the display apparatus;
- identifying a noise signal related to a driving signal in a driving signal line of the display apparatus using a noise sensing line disposed in a non-display area of the display apparatus; and
- identifying information on the touch input based on the touch input signal and the noise signal, wherein the noise sensing line is spaced apart from a touch line by a first distance in a non-display area of the display apparatus, a guard line is disposed between the touch line and the noise sensing line, a cathode is disposed below the touch line, the noise sensing line, and the guard line, and the driving signal line does not overlap with the touch line and the noise sensing line from a plan view.

18. The operating method of claim 17, wherein the noise signal comprises a signal related to noise caused in response to the driving signal.

19. The operating method of claim 17, wherein identifying information on the touch input comprises identifying the information on the touch input based on a signal acquired by removing the noise signal from the touch input signal.

20. The operating method of claim 17, wherein the information on the touch input comprises information on a position of the touch input with respect to a display area of the display apparatus.

21. The display apparatus of claim 1, wherein the cathode extends to overlap the touch line, the guard line, and the noise sensing line from a plan view.

22. A display apparatus with a touch function comprising:
- a touch line electrically connected to a touch electrode disposed in a display area of the display device;
- a noise sensing line disposed to be spaced apart from the touch line by a first distance in a non-display area of the display device;
- a driving signal line configured to provide a driving signal of the display device in the non-display area;
- a ground line disposed adjacent to the noise sensing line;
- a cathode disposed in a layer between a layer in which the ground line is disposed and a layer in which the driving signal line is disposed; and
- a touch driving circuit configured to identify information on a touch input using a touch input signal acquired through the touch line and a noise signal acquired through the noise sensing line,
- wherein the driving signal line does not overlap with the touch line and the noise sensing line from a plan view.

23. The display apparatus of claim 22, further comprising a guard line disposed between the touch line and the noise sensing line,
wherein the cathode is disposed below the touch line, the noise sensing line, and the guard line.

24. The display apparatus of claim 22, further comprising a guard line disposed between the touch line and the noise sensing line,
wherein the cathode extends to overlap the touch line, the guard line, and the noise sensing line from a plan view.

* * * * *